(12) United States Patent
Scribante

(10) Patent No.: US 8,522,445 B1
(45) Date of Patent: Sep. 3, 2013

(54) MARKING GAUGE FOR ELECTRONIC MEASUREMENT AND DISPLAY

(76) Inventor: John H. Scribante, Plymouth, WI (US)

( * ) Notice: Subject to any disclaimer, the term of this patent is extended or adjusted under 35 U.S.C. 154(b) by 221 days.

(21) Appl. No.: 13/081,682

(22) Filed: Apr. 7, 2011

(51) Int. Cl.
*G01B 3/10* (2006.01)
*G01B 3/56* (2006.01)

(52) U.S. Cl.
USPC ..................................... 33/42; 33/534; 33/784

(58) Field of Classification Search
USPC ...................................... 33/42, 770, 783, 784
See application file for complete search history.

(56) References Cited

U.S. PATENT DOCUMENTS

| | | | | |
|---|---|---|---|---|
| 5,386,643 | A * | 2/1995 | Corcoran | 33/762 |
| 5,477,621 | A * | 12/1995 | Koizumi et al. | 33/784 |
| 5,901,458 | A * | 5/1999 | Andermo et al. | 33/810 |
| 6,223,136 | B1 * | 4/2001 | Geiger | 33/1 L |
| 6,223,446 | B1 * | 5/2001 | Potter | 33/764 |
| 6,279,248 | B1 * | 8/2001 | Walters | 33/784 |
| 6,574,582 | B1 * | 6/2003 | Geiger | 33/1 L |
| 6,880,258 | B2 * | 4/2005 | Adams et al. | 33/371 |
| D517,931 | S | 3/2006 | Hyde | |
| 7,231,726 | B2 * | 6/2007 | Matsumiya et al. | 33/755 |
| 7,269,906 | B1 | 9/2007 | Lee | |
| 7,530,177 | B1 * | 5/2009 | Meichle et al. | 33/708 |
| 8,256,128 | B2 * | 9/2012 | Kozykowski | 33/534 |
| 2012/0023768 | A1 * | 2/2012 | Stockman | 33/701 |
| 2012/0159798 | A1 * | 6/2012 | Kozykowski | 33/534 |

\* cited by examiner

*Primary Examiner* — Yaritza Guadalupe-McCall
(74) *Attorney, Agent, or Firm* — Schwegman Lundberg & Woessner, P.A.

(57) ABSTRACT

One example includes an apparatus to mark a distance from an edge of a work-piece that includes a shaft extending along a longitudinal axis and including a graduations disposed aligned along the longitudinal axis, a marking blade affixed to an end portion of the shaft, substantially transverse to the longitudinal axis of the shaft, a fence assembly coupled to the shaft and movable along the longitudinal axis of the shaft, the fence assembly including a face configured to abut the edge of the work-piece, a graduation sensor coupled to the fence assembly and configured to monitor the graduations to provide a sensor signal associated with a distance between the fence assembly and the marking blade, and a monitoring circuit coupled to the fence assembly in communication with the graduation sensor and configured to receive the sensor signal and to provide a distance signal including information associated with the distance.

18 Claims, 13 Drawing Sheets

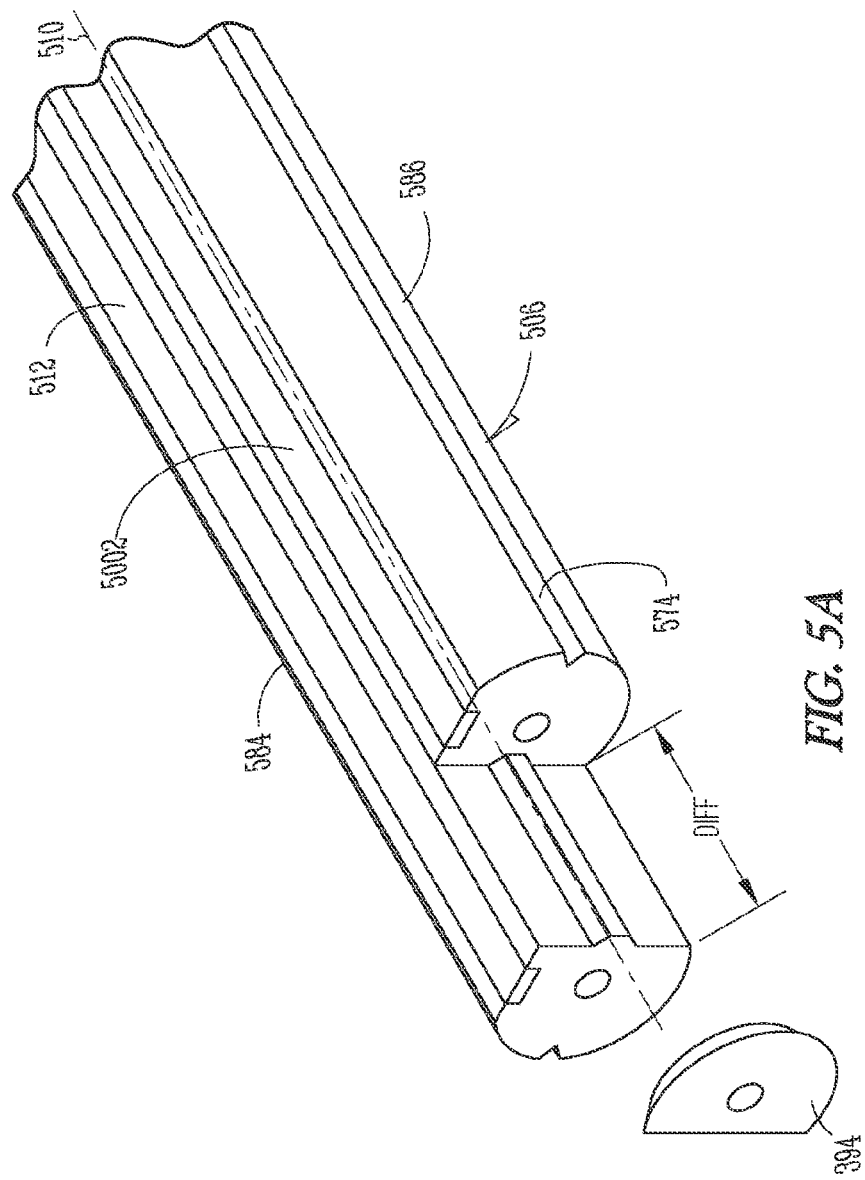
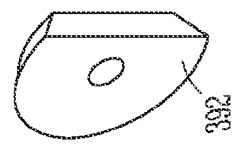
FIG. 5A

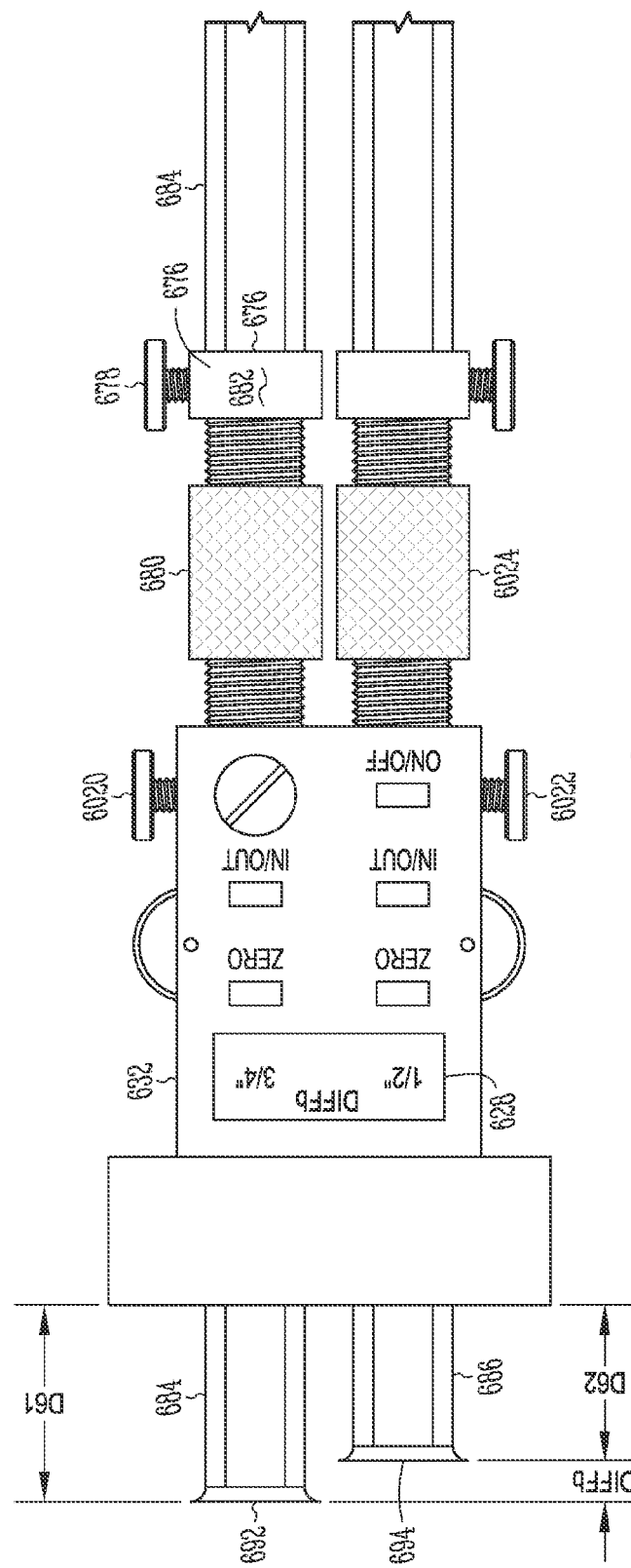

MARKING GAUGE FOR ELECTRONIC MEASUREMENT AND DISPLAY

TECHNICAL FIELD

This document relates generally to methods and apparatus for measurement and more particularly to a marking gauge for electronic measurement and display.

BACKGROUND

Craftsman such as woodworkers find it useful to mark a work-piece, such as a length of wood, at a regular distance from an edge of the wood. Existing marking gauges are inaccurate, imprecise and cumbersome. To promote the state of the art, craftsman desire an apparatus to precisely and accurately mark a work-piece.

BRIEF DESCRIPTION OF THE DRAWINGS

The drawings illustrate generally, by way of example, various embodiments discussed in the present document. The drawings are for illustrative purposes only and may not be to scale.

FIG. 5A is a perspective view of a portion of a marking gauge including a split shaft, according to some examples.

FIG. 6 is a front view of a marking gauge for electronic measurement and display using two shafts, according to some examples.

DETAILED DESCRIPTION

Figure 1A:
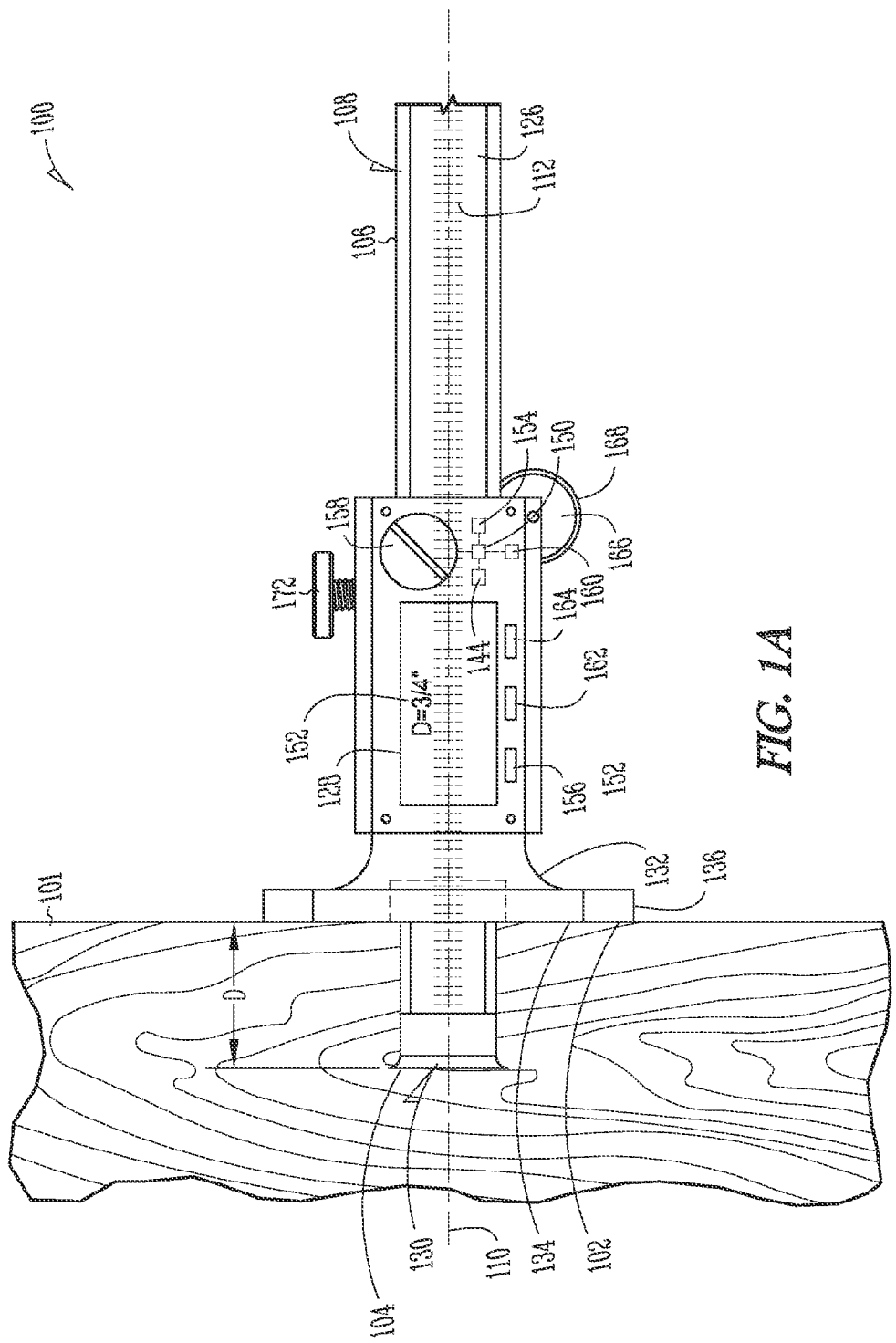
FIG. 1A is a front view of a marking gauge for electronic measurement and display, according to some examples.
Figure 1B:
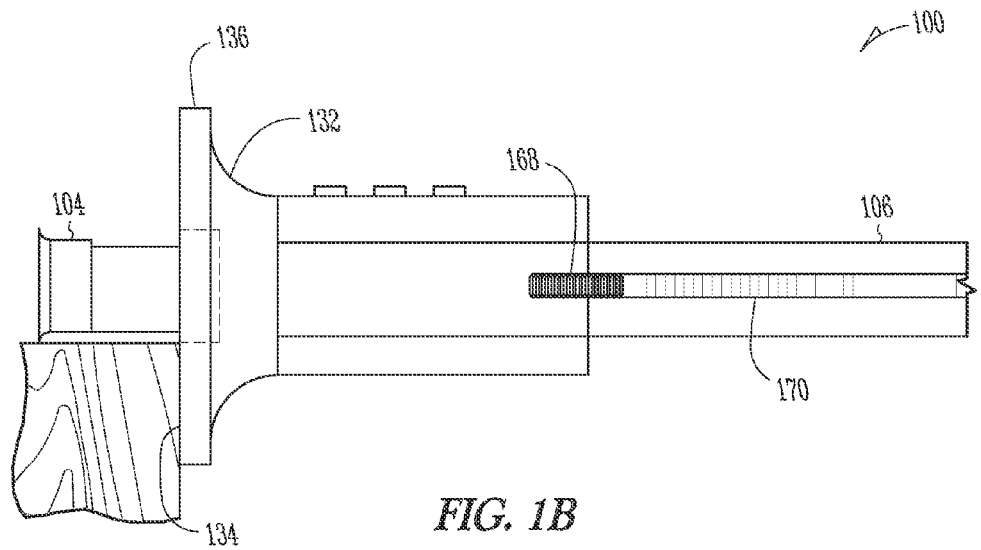
FIG. 1B is a bottom view of the marking gauge of FIG. 1A.
Figure 1C:
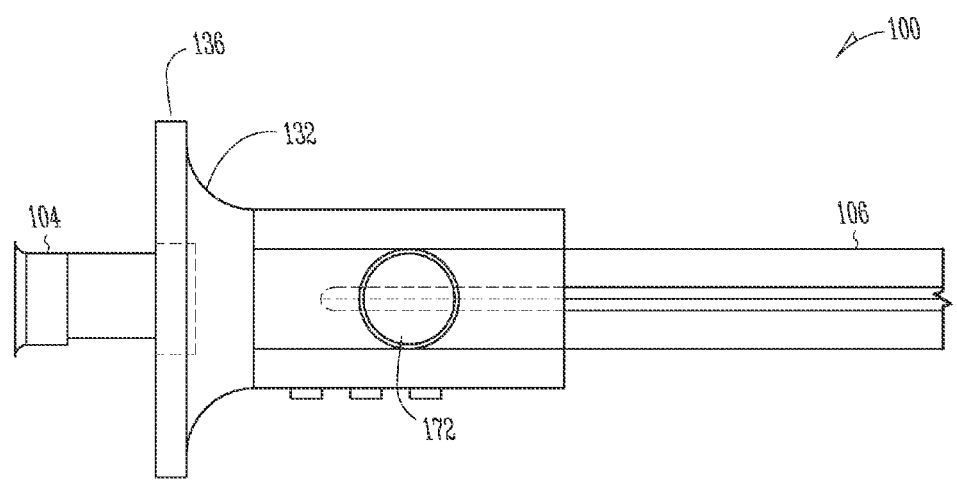
FIG. 1C is a top view of the marking gauge of FIG. 1A.
Figure 1D:
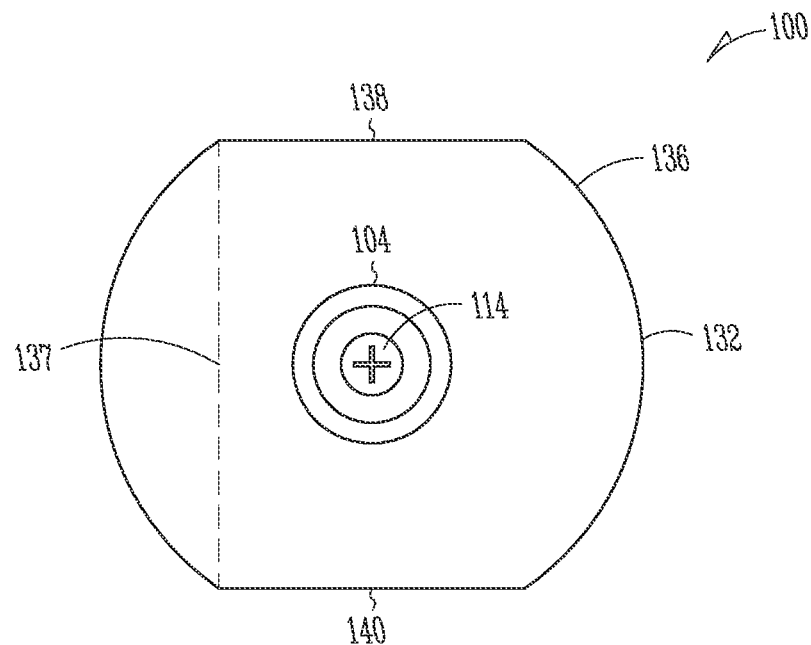
FIG. 1D is a left side view of the marking gauge of FIG. 1A.
Figure 1E:
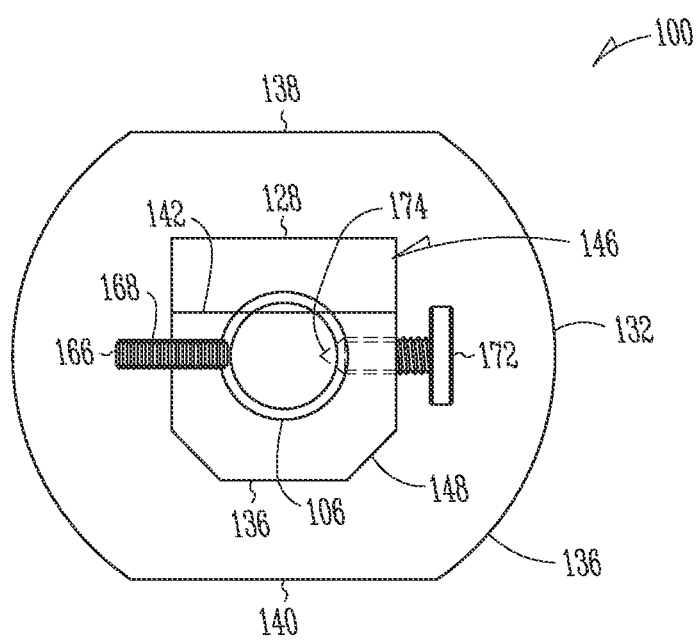
FIG. 1E is a right side view of the marking gauge of FIG. 1A.
Figure 1F:
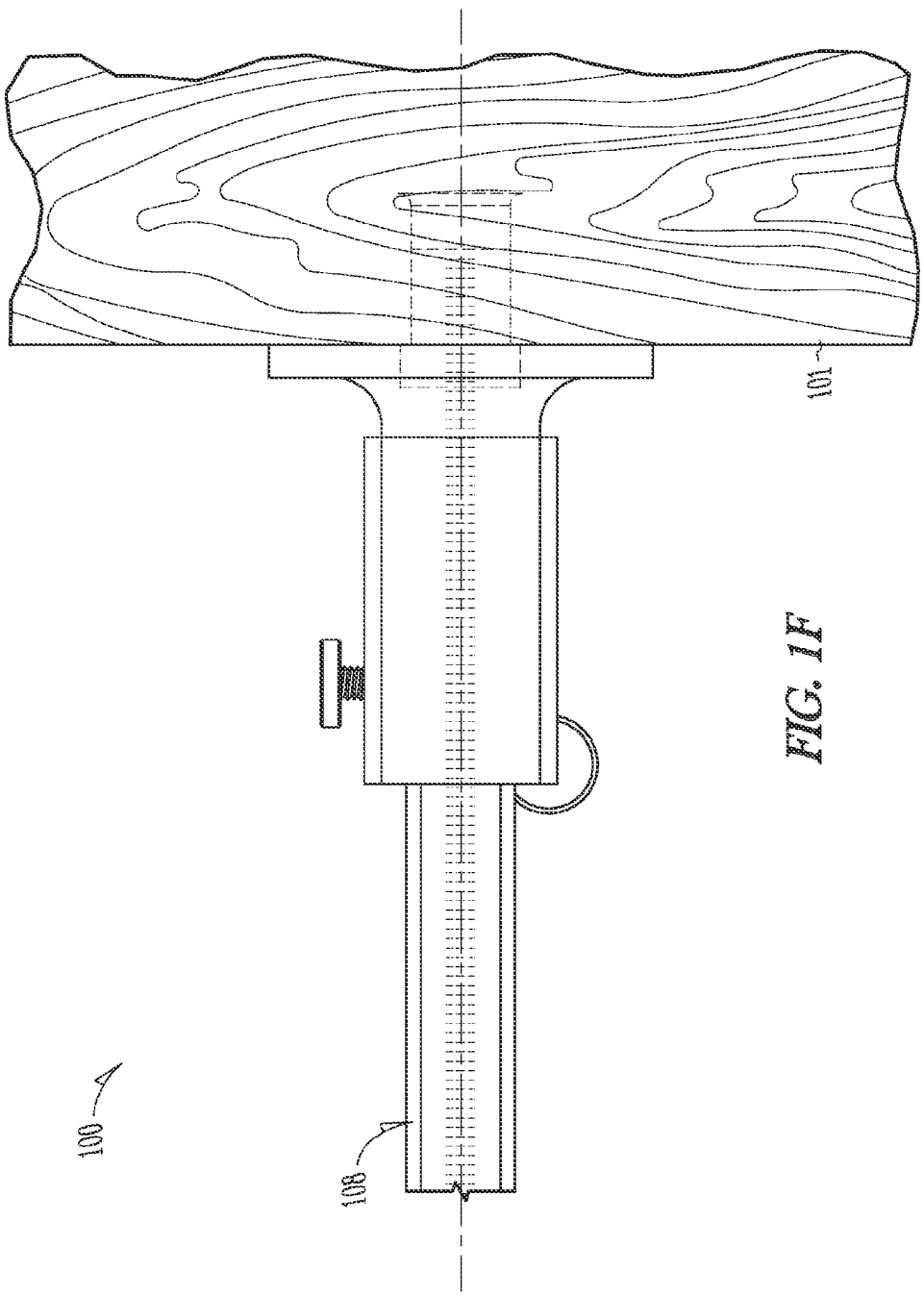
FIG. 1F is a back view of the marking gauge of FIG. 1A.

Some marking gauges mount a marking blade to a shaft, and then dispose the shaft through a collar including a fence assembly and a lock such as a lock screw to lock the position of the fence assembly with respect to the blade. These are simple devices and are difficult to use to create repeatable, accurate markings. The present examples provide an improved depth or marking gauge capable of creating accurate and precise markings.

FIGS. 1A-1H provide various views of a marking gauge 100 for electronic measurement and display, according to some examples. The marking gauge is used to mark a distance D from an edge 102 of a work-piece 101, such as a length of wood or steel. Marking is accomplished as the marking blade 104 influences the work-piece 101 as it travels along the work-piece 101. For example, as the marking blade 104 travels along the work-piece 101, it indents, scores, cuts or otherwise influences the work-piece 101.

The marking gauge 100, in various examples, includes a shaft 106. In various examples, the shaft 106 is part of a shaft assembly 108 that also includes the marking blade 104. In various examples, the shaft 106 extends along a longitudinal axis 110. The shaft is constructed of a rigid material, such as a metal or a rigid polymer. In various examples, the marking blade 104 is affixed to an end portion 130 of the shaft 106. The marking blade 104 is constructed of a rigid material, such as a metal or a rigid polymer. In some examples, the marking blade 104 is substantially transverse to the longitudinal axis of the shaft 106, but the present subject matter is not so limited. According to various examples, the shaft 106 is at least partially cylindrical. In certain examples, the shaft 106 comprises a flat side portion 126 defining a plane that is substantially parallel to the longitudinal axis 110.

Figure 1G:
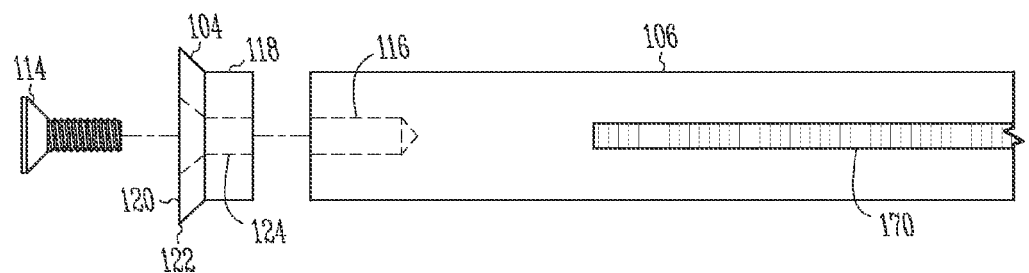
FIG. 1G is a bottom view of a shaft of the marking gauge of FIG. 1A.
Figure 1H:
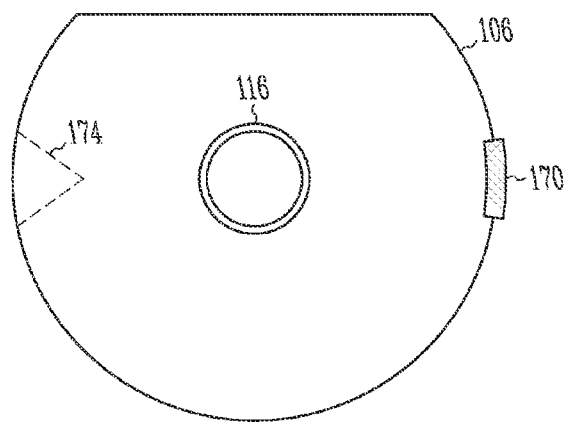
FIG. 1H is a left side view of the shaft of FIG. 1G.

According to several examples, the marking blade 104 is at least partially circular. In some instances, the marking blade 104 is completely circular. In some examples, the marking blade 104 is concentric with the shaft 106. In certain examples, a center of the marking blade 104 is offset from the a center of the shaft 106. In some examples, the marking blade 104 is nonrotably fixed to the shaft 106. For example, the marking blade 104 is fastened, adhered, welded, or formed as part of the shaft. As illustrated in the example of FIG. 1G, a screw, such as a machine screw 114, fastens the marking blade 104 to the shaft 106. In certain examples, the shaft includes a threaded bore 116. The marking blade 104 illustrated includes a boss 118, but the present subject matter is not so limited. In some instances, the marking blade 104 includes a bore 124 through which a fastener passes to fix the marking blade 104 to the shaft 106. In some examples, an adhesive or a weld is disposed in the bore 124 to attach the marking blade 104 to the shaft 106. In some examples, the marking blade is rotable with respect to the shaft. For example, the marking blade 104 is free to rotate around a fastener extending through the bore 124 and fixed to the shaft 106 in some configurations.

The marking blade 104 illustrated includes a face 120 extending out to the marking edge 122, but the present subject matter is not so limited to this profile, as other profiles are possible including, but not limited to, planar concave profiles, wedge profiles, and chisel profiles, in one sided and two sided configurations. In certain examples, the marking blade is substantially planar. In some instances, marking blade is disk shaped. In various examples, a centerline of the marking blade is perpendicular to the marking edge 122 of the marking blade 104, and is substantially parallel to the longitudinal axis 110 of the shaft 106. In some examples, the centerline is coincident to the longitudinal axis 110 of the shaft 106.

In various examples, graduations 112 are associated with the shaft assembly 108, according to some examples. In various examples, the graduations 112 are disposed aligned along the longitudinal axis 110. In certain examples, the graduations 112 are visible. In some instances, the graduations 112 are hidden from view. According to certain examples, the graduations 112 are disposed on or below a flat side portion 126, as pictured in FIG. 1A. In certain examples, the graduations 112 are adhered to the shaft. For example, metallic graduations are adhered to the shaft in some configurations.

In some examples, the graduations 112 are formed in the shaft. For example, the shaft is machined to define the graduations, in some example. In some examples, the graduations 112 are etched in the shaft 106. In certain examples, the graduations 112 are formed as part of the shaft. For example, in some instances the shaft 106 is polymeric the graduations are molded on the surface of the shaft 106. In some instances, the graduations 112 include materials insert molded into the shaft. In some examples, the graduations 112 comprise a stator. In certain examples, the graduations 112 form a portion of a printed circuit affixed to the shaft, 106. In some examples, a printed circuit board is adhered to the shaft 106. Certain examples pot graduations 112 such as graduations as part of a printed circuit board into a channel cut into the shaft 106.

Examples include a fence assembly 132 coupled to the shaft and movable along the longitudinal axis 110 of the shaft 106. In various examples, the fence assembly 132 includes a face 134 configured to abut the edge 102 of a work-piece 101. In some examples, the face 134 is planar. In some examples, it is convex. Some examples include a concave face 134. In some examples, a convex face 134 is useful such as for marking s-shaped pieces of wood.

As the fence assembly 132 slides along the edge 102 of the work-piece 101, the marking blade 104 marks the work-piece 101. In various examples, the fence assembly 132 comprises an edge 136 circumscribing the face of the fence assembly 132. In various examples, the fence assembly 132 is at least partially circular. In various examples, the at least partially circular shape is to discourage rolling of the tool off of a surface when not in use. In certain examples, the fence assembly 132 includes a first straight portion 138. In some instances, the edge comprises a second straight portion 140. In some examples, the second straight portion 140 is opposite to the first straight portion 138. In some examples, the second straight portion 140 is parallel with the first straight portion 138. Some examples include a perpendicular straight portion 137 that defines a plane that is perpendicular to the first straight portion 138.

In some examples, the fence assembly 132 is keyed to the flat side portion 126 of the shaft 106 such that rotation of the fence assembly 132 with respect to the shaft 106 is restricted. For example, the fence assembly includes a flat portion 142 keyed to the flat side portion 126 of the shaft 106. In various examples, the fence includes a top portion 146 coupled to a bottom portion 148. In some examples, the top portion 146 comprises a housing to house the display and other components, such as circuits and sensors.

Various examples include a graduation sensor 144 coupled to the fence assembly. In various examples, the graduation sensor 144 is configured to monitor the graduations 112 to provide a sensor signal associated with a distance D between the fence assembly 132 and the marking blade 104. In certain examples, the graduation sensor 144 includes a hall effect sensor to monitor a stator.

In various examples, a monitoring circuit 150 is coupled to the fence assembly 132 in communication with the graduation sensor 144 and configured to receive the sensor signal and to provide a distance signal including information associated with the distance. In some instances, the monitoring circuit 150 includes a memory 160 to store at least one measurement. In various examples, the display 128 is to display one or more measurements stored in the memory circuit 160.

In some examples, the monitoring circuit 150 is in communication with a calibration circuit 154 to receive a calibration input to calibrate the distance signal in association with an input, such as a switch such as a hand-actuable switch or button 162 coupled to the fence assembly 132 or another input. In various examples, the calibration circuit 154 is to calibrate the distance D at zero in association with the input. In some examples, the distance D is calibrated to zero when the marking edge 122 is flush with the face 134 of the fence assembly 132.

In various examples, the monitoring circuit 150 is programmed to translate the distance D between at least two of a plurality of measurement systems. In certain examples, the plurality of measurement systems includes an imperial decimal measurement system, an imperial factional measurement system and a metric measurement system. Some instances include at least one switch or button 156 is coupled to the fence assembly 132 in communication with the monitoring circuit 150. In certain examples, the at least one input such as a switch such as a hand-actuable switch 156 actuable to select one of the plurality of measurement systems.

Some examples include a data input coupled to the fence assembly 132 in communication with the monitoring circuit 150 to program the monitoring circuit 150. In some instances, the data input includes a switch such as a hand-actuable switch or button actuable to select one of the measurement systems of the plurality of measurement systems. In some examples, the input is to reset the monitoring circuit.

Certain examples include a battery 158 coupled to the monitoring circuit 150 to power the monitoring circuit 150. In some instances, the monitoring circuit 150 is configured to power the graduation sensor 144. In some examples, at least one input such as a switch such as a hand-actuable switch or button 164 configured to control electrical communication between the battery and the monitoring circuit. In some examples, the battery 158 is configured to power the graduation sensor 144, such as directly.

Various examples include a display 128 coupled to the fence assembly 132 in communication with the monitoring circuit 150 to receive the distance signal and display the information 152 associated with the distance D. In certain examples, the display 128 includes a digital display. In some instances, the display 128 is configured to transmit information to a human readable display. Some examples include at least one switch in communication with the monitoring circuit and configured to program the monitoring circuit.

Various examples include a thumb wheel 166, rotably fixed to the fence assembly, configured to roll along the shaft 106 to move the fence assembly with respect to the shaft. In some examples, the thumb wheel 166 abrades the shaft 106, with the friction sufficient to move the fence assembly 132 with respect to the shaft 106. In some examples, teeth 168 of the thumb wheel are configured to mesh teeth 170 of the shaft. Tooth profiles include straight, canted, helical and the like. In some examples, the thumb wheel 166 is disposed in and is in contact with a channel 174, which in some instances is a v-shaped channel.

Some examples mount the thumb wheel 166 to a mount using an axle. In some examples, the axle is rigidly fixed to the mount. In some examples, the axle is mounted to mount and is free to move a selected amount, such that the thumb wheel 166 is free to move against and away from the shaft 106. In additional examples, the axle is free to travel along slots in the mount.

Certain examples include a lock 172 such as a screw is disposed in the fence assembly 132 to lock the fence assembly 132 in position with respect to the shaft 106. In certain examples, the lock 172 is configured to engage a channel 174 disposed in the shaft.

Figure 2A:
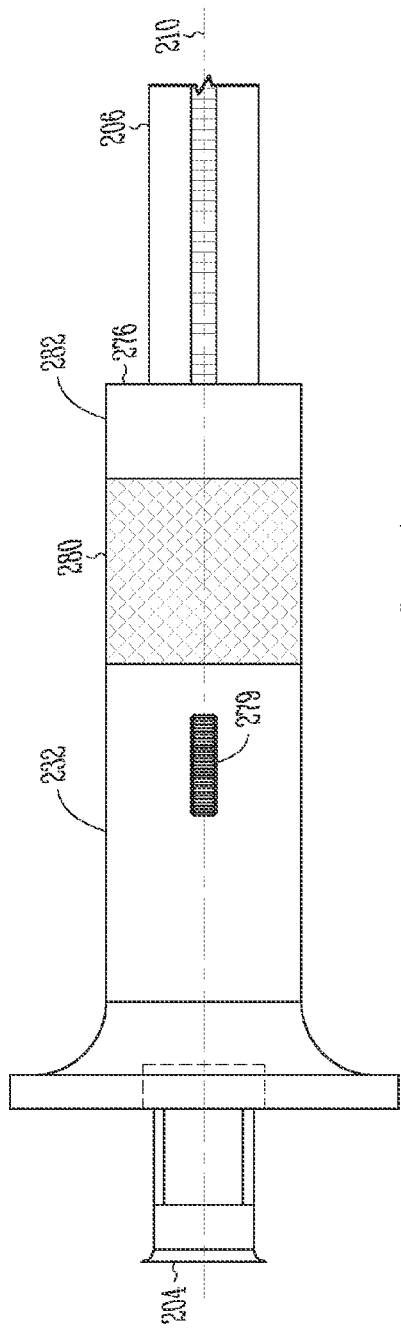
FIG. 2A is a bottom view of a marking gauge for electronic measurement and display and fine adjustment, according to some examples.
Figure 2B:
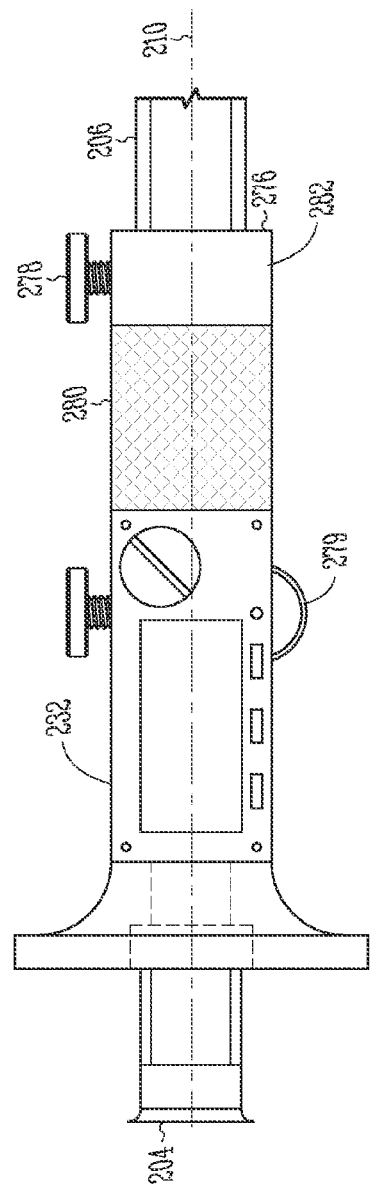
FIG. 2B is a front view of the marking gauge of FIG. 2A.
Figure 3A:
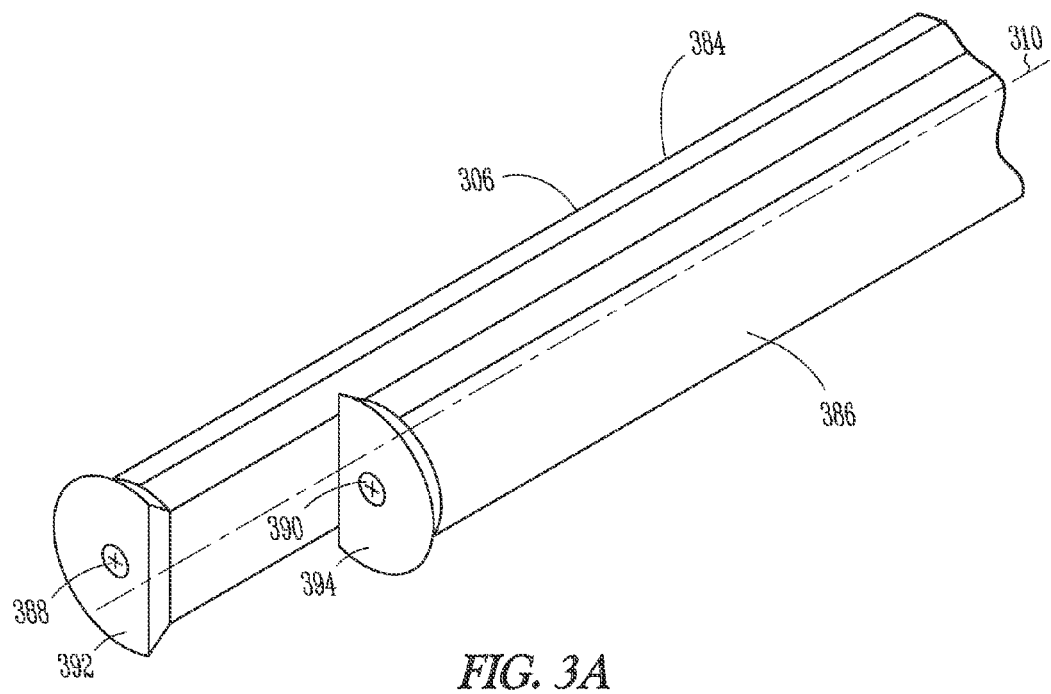
FIG. 3A is a perspective view of a split shaft, according to some examples.
Figure 3B:
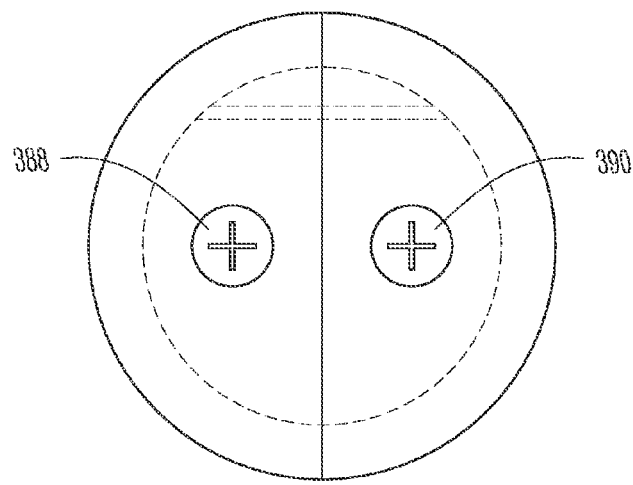
FIG. 3B is a left side view of the split shaft of FIG. 3A.

FIGS. 2A-2B provide various views of a marking gauge for electronic measurement and display and fine adjustment, according to some instances. Examples include a fence assembly 232 coupled to the shaft and movable along the longitudinal axis 210 of the shaft 206. Certain examples include a collar 276 slidably disposed on the shaft 206. In certain examples, the fence assembly 232 is disposed between the marking blade 204 and the collar 276. In some examples, the collar 276 includes a lock 278 configured to lock a position of the collar 276 with respect to the shaft 206. In certain examples, the collar includes regular features such as threads, and an adjustment ring 280 is positively engaged with the regular features such as threads. In some instances, the adjustment ring is disposed between a non-threaded portion 282 of the collar 276 and the fence assembly 232. In some examples, the adjustment ring 280 is configured to rotate around the collar 276 to displace the fence assembly 232 along the shaft 206 with respect to the collar 276.

The collar 276 is used to provide finer distance adjustments than are typically possible through adjustments made otherwise, such as via the thumb wheel 279.

FIGS. 3A-3D provide various views of a split shaft, according to certain examples. In various examples, the shaft 306 is split along the longitudinal axis 310 into a first shaft portion 384 and a second shaft portion 386. In some instances, the first shaft portion 384 is slidable with respect to the second shaft portion 386. Fasteners 388 and 390 fasten respective first marking blade 392 and second marking blade 394 to the respective first shaft portion 384 and second shaft portion 386.

Figure 4A:
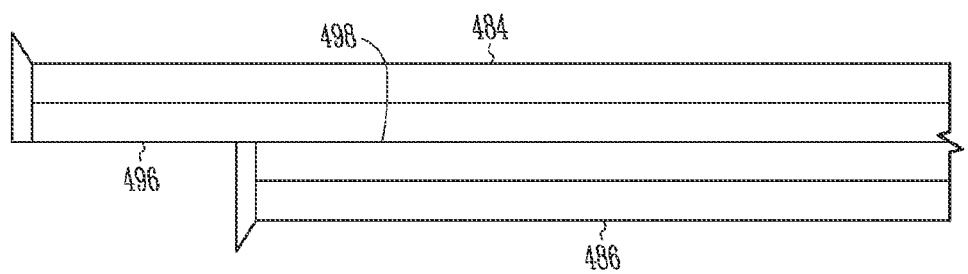
FIG. 4A is a top view of a split shaft including a channel, according to some examples.
Figure 4B:
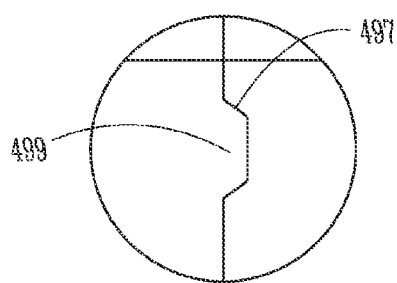
FIG. 4B is a right side view of the split shaft of FIG. 4A.

FIGS. 4A-4B provide various views of a split shaft, according to some examples. In certain examples, a first inner face 496 of a first shaft portion 484 is channel 497, and a second inner face 498 of the second shaft portion includes a protrusion 499 mated to the channel 497.

Figure 5B:
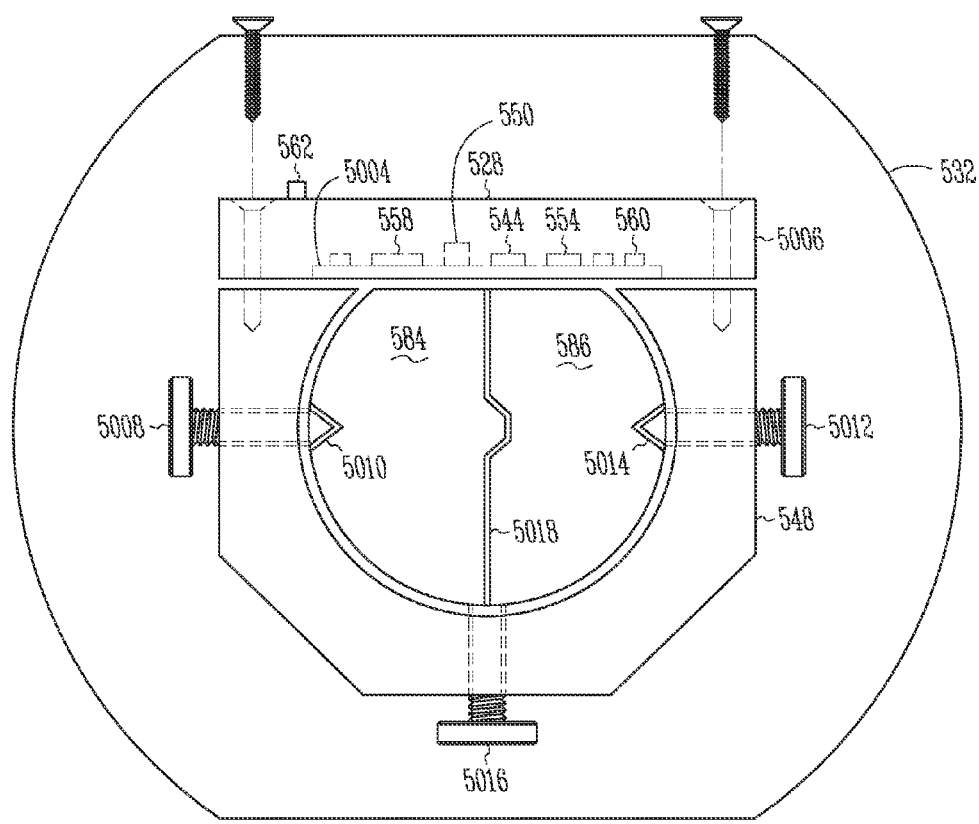
FIG. 5B is a right side view of the marking gauge of FIG. 5A.

FIGS. 5A-5B provide various views of a split shaft including a mated channel and protrusion and a stator, according to some examples. Various examples include a first marking blade 592 affixed to a first shaft portion 584. Various examples include a second marking blade 594 affixed to the second shaft portion 586. Certain examples include graduations 512. In certain examples, the graduations comprise a stator. Certain examples comprise additional graduations 5002 disposed on second shaft portion 586 in alignment with the longitudinal axis 510 of the shaft 506. In certain examples, a graduation sensor 544 is configured to monitor the additional graduations 5002 to provide a second sensor signal associated with a second distance between the fence assembly 532 and the second marking blade 594. In certain examples, a monitoring circuit 550 is configured to provide a second distance signal including information associated with the second distance. In certain examples, a display 528 is configured to receive the second distance signal and display the information associated with the second distance. In some instances, the monitoring circuit 550 is configured to determine a difference DIFF between the distance and the second distance. In some examples, the display 528 is configured to display the difference. In additional examples, the display indicates a total by adding measurements from the fence to the first marking blade 592 and the second marking blade 594. Some examples include a battery 558 coupled to the monitoring circuit 550 to power the monitoring circuit 550. In certain examples, the monitoring circuit 550 includes a memory 560 to store at least one measurement. In some instances, the monitoring circuit 550 is in communication with a calibration circuit 554 to receive a calibration input to calibrate the distance signal in association with an input, such as a switch such as a hand-actuable switch or button 562 coupled to the fence assembly 532 or another input.

In some examples, one or more of the memory 560, the battery 558, the graduation sensor 544 and the calibration circuit 554 are disposed in communication with one another on a printed circuit board 5004. In some examples, the printed circuit board is coupled to a housing 5006. In certain examples, the housing 5006 is coupled to a bottom portion 548.

Various examples comprise a first lock such as a lock screw 5008 disposed in the fence assembly 532 to lock the fence assembly in position with respect to the first shaft portion 584. In some instances, the first lock such as a lock screw 5008 is configured to engage a first channel 5010 disposed in the first shaft portion 584.

Some examples include a second lock such as a lock screw 5012 disposed in the fence assembly 532 to lock the fence assembly 532 in position with respect to the second shaft portion 586. In some examples, the second lock such as a lock screw 5012 is configured to engage a second channel 5014 disposed in the second shaft portion 586. Certain examples include a lock such as a lock screw 5016 disposed in the fence assembly 532 to lock the fence assembly 532 in position with respect to the first shaft portion 584 and the second shaft portion 586. In some instances, the lock such as a lock screw 5016 is configured to engage the first shaft portion 584 and the second shaft portion 586 along a seam 5018 between the first shaft portion 584 and the second shaft portion 586.

FIG. 6 is a front view of a marking gauge for electronic measurement and display using two shafts, according to some examples. Certain examples include a first shaft 684 and further comprising a second shaft 686, wherein the fence assembly 632 is coupled to the first and second shaft and movable along a second longitudinal axis of each of the first 684 and second 686 shaft. In various examples, the longitudinal axis of each of the first and second shaft is parallel. Various examples include a first marking blade 692 affixed to the first shaft 684 and a second marking blade 694 affixed to the second shaft 686. In various examples, graduations are disposed on each of the first 684 and second 686 shaft. In various embodiments, a respective stator is embedded in each of the first 684 and second 686 shafts. In various examples, each are sensed, monitored and/or displayed, as set forth herein in relation to other examples. In various examples, a monitoring circuit is configured to determine a difference DIFF6 between a distance D61 and a second distance D62, and a display is configured to display the difference DIFF6.

Various examples include a first lock such as a lock screw 6020 disposed in the fence assembly 632 to lock the fence assembly in position with respect to the first shaft 684. Some examples include a second lock such as a lock screw 6022 disposed in the fence assembly 632 to lock the fence assembly in position with respect to the second shaft. Certain examples include a collar 676 slidably disposed on the shaft 684. In certain examples, the fence assembly 632 is disposed between the marking blade 692 and the collar 676. In certain examples, the collar 676 includes a lock such as a lock screw 678 configured to lock a position of the collar 676 with respect to the shaft 684. In certain examples, the collar 676 includes regular features such as threads, and an adjustment ring 680 is positively engaged with the regular features such as threads. In some examples, threads are threaded into each side of the adjustment ring 680. In some examples, the threads into one side of the adjustment ring 680 are right-handed, and the threads into the other side of the adjustment ring 680 are left-handed, but the present subject matter is not so limited. In some instances, the adjustment ring is disposed between a non-threaded portion 682 of the collar 676 and the fence assembly 632. In some instances, the adjustment ring 680 is configured to rotate around the collar 676 to displace the fence assembly 632 along the shaft 684 with respect to the collar 676. Some examples include a second collar assembly 6024.

Figure 7:
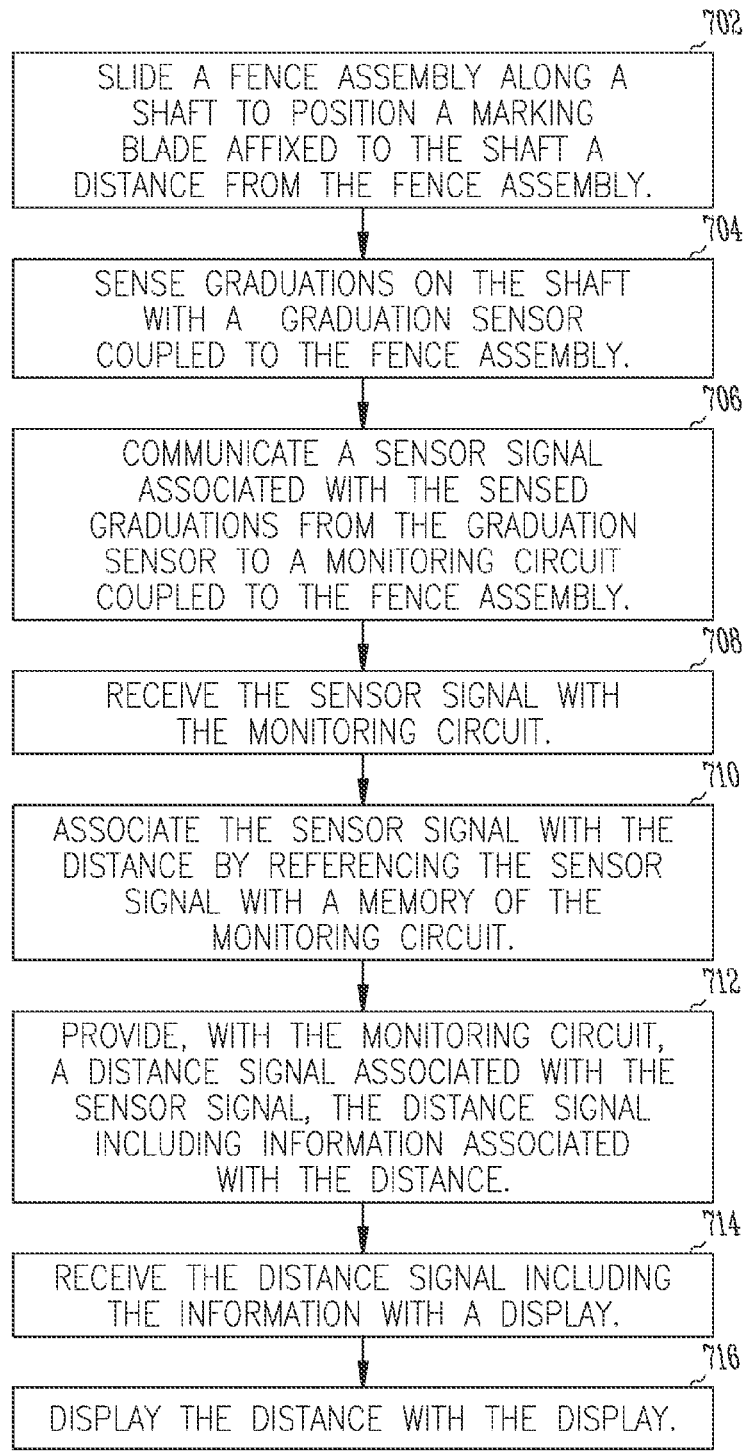
FIG. 7 illustrates a method for electronically marking a measurement and displaying the measurement.

FIG. 7 is method of marking using electronic measurement and display, according to some examples. In various examples, the method is to mark a distance from an edge of a work-piece. At 702, the method includes sliding a fence assembly along a shaft to position a marking blade affixed to the shaft a distance from the fence assembly, in some examples. In some examples, the fence to shaft distances is calibrated beforehand. At 704, the method includes sensing graduations on the shaft with a graduation sensor coupled to the fence assembly, in some examples. At 706, the method includes communicating a sensor signal associated with the sensed graduations from the graduation sensor to a monitoring circuit coupled to the fence assembly, in some examples. At 708, the method includes receiving the sensor signal with the monitoring circuit, in some examples. At 710, the method includes associating the sensor signal with the distance by referencing the sensor signal with a memory of the monitoring circuit, in some examples. At 712, the method includes providing, with the monitoring circuit, a distance signal associated with the sensor signal, the distance signal including information associated with the distance, in some examples. At 714, the method includes receiving the distance signal including the information with a display, in some examples. At 716, the method includes displaying the distance with the display, in some examples.

According to some optional examples, a method comprises sliding a collar onto the shaft, with the fence assembly disposed between the marking blade and the collar, locking a position of the collar with respect to the shaft, and adjusting the position of the fence assembly with respect to the shaft by turning a ring threaded onto the collar. In some options, a method includes translating, with the monitoring circuit, the distance signal from a first system of measurement to a second system of measurement.

Figure 8:
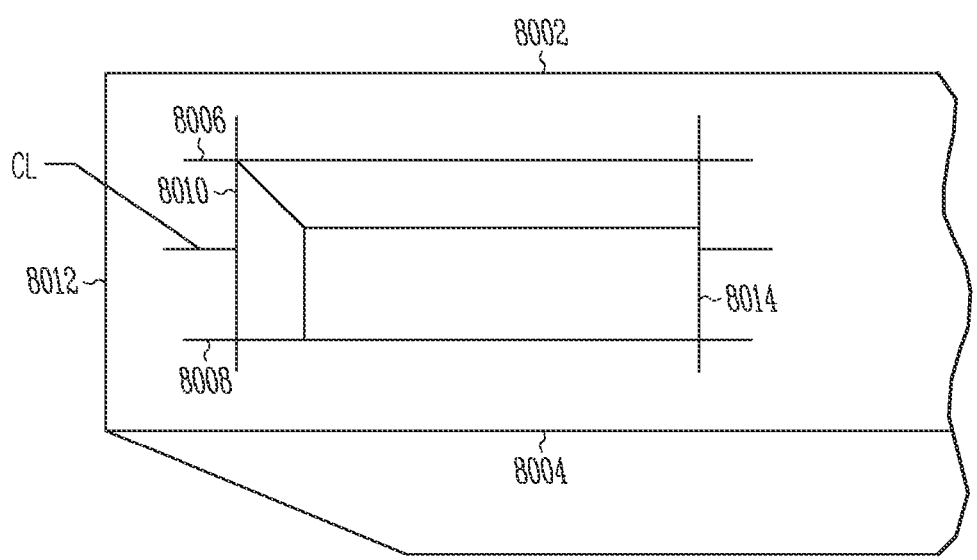
FIG. 8 shows a marked work-piece, according to some examples.

FIG. 8 shows a marked work-piece, according to some examples. In one method, a marking gauge as set forth herein is used to make a symmetrical mortise (e.g., a mortise that is centered in the stock) and tenon. In various examples, the method includes calibrating the tool by adjusting both shafts such that the marking blades are flush to the face of the fence and calibrating or zeroing the gauges, as set forth herein. In some examples, the fence includes a recess to receive all or a portion of a marking blade.

In various examples, the method includes measuring a width of the stock by placing the fence against a first stock edge 8002 and extending one of the two shafts such that a marking blade reaches a second stock edge 8004. In various examples, a programmable input, such as a "mode" button, is depressed until the display indicates a desired mode, such as by displaying "CL." In various examples, CL mode is used to determine a centerline. In various examples, the marking gauge displays a centerline measurement. In various examples, the other of the shafts is adjusted until a displayed centerline difference is zero, indicating that the other of the marking blade is at the centerline, allowing the operator to mark the centerline. In various examples, in the centerline mode the two shafts are adjusted to mark additional marks, such as by sliding, until a desired measurement shows on the display. For example, to mark a ½ inch wide mortise at the centerline, an operator slides one of the shafts until the display reads "+¼ inch" and slide the other shaft until the display reads "−¼ inch" and the display indicates a difference or total "½." In some examples, a sum of the distances between the first marking blade and the centerline and the second marking blade and the centerline is displayed.

In various examples, an operator can actuate an input, such as a memory input, such as a "save" button, until the display indicates a stored value, such as "M1." This allows an operator to mark several marks precisely.

Various examples mark additional shoulder cut lines 8006 and 8008. Some examples recess the marking blades into the fence to zero them. Various examples mark shoulder cuts by placing the fence at edge 8012 and moving one of the shafts to line 8010 and the other shaft to line 8014. In some examples, a memory is actuated, such as by pressing a "save" button until the display indicates a further stored value, such as "M2." In various examples, "M1" and "M2" are stored values in a memory circuit. Measurements are stored and used to enable an operator to create a symmetrical mortise and tenon layout.

In some examples, an operator lays out a tenon. In some examples, the tenon stock is the same thickness as the mortise stock. In some examples, the operator can depress an input, such as a "recall" button, such as to display "M1" on the display. In some examples, the operator can slide the shafts until the display shows "0", representing that the variance between the memory and the current setting has reached 0 units of measure. In various examples, the operator marks the first two shoulder cuts on the end of the tenon. In various examples, the operator depresses an input such as a "recall" input until "M2" shows and similarly slides the shafts until the display shows zero units of measure. In various examples, the operator marks the second two shoulder cuts on the end of the tenon.

In some examples, a narrower or thicker stock is used for the tenon. In some of these examples, an offset function is used. In various examples, an offset function is used by selecting an offset mode, such as by depressing an input. In various examples, an operator actuates an input such, as "recall," to recall one of the stored units of measure such as M1 or M2. In various examples, shafts are set into desired place with zero difference from the stored units of measure. Following this, a programmable input is selected until the display indicates offset mode has been selected, such as by displaying "OS." In various examples, an operator slides one of the shafts with respect to the fence until a desired offset is shown. In some examples, the operator depresses a programmable input to store the offset. In doing so, M1 is stored anew, such as M1', including an offset. In some examples, the operator actuates an input such as a "recall" to recall the stored values M1' or M2' to make offset marks at M1' or M2', without having to calculate the offset. For example, a distance from the fence to the blade of M1' is displayed, and when the blade is at zero for M1', the blade is in position for marking at the offset.

The detailed description of the present invention refers to subject matter in the accompanying drawings that shows, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The detailed description is, therefore, not to be taken in a limiting sense, and the scope is defined only by the appended claims, along with the full scope of legal equivalents to which such claims are entitled.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. Apparatus to mark a distance from an edge of a workpiece, comprising:
   a shaft extending along a longitudinal axis and including a graduations disposed aligned along the longitudinal axis;
   a marking blade affixed to an end portion of the shaft, substantially transverse to the longitudinal axis of the shaft;
   a fence assembly coupled to the shaft and movable along the longitudinal axis of the shaft, the fence assembly including a face configured to abut the edge of the workpiece;
   a graduation sensor coupled to the fence assembly and configured to monitor the graduations to provide a sensor signal associated with a distance between the fence assembly and the marking blade;
   a monitoring circuit coupled to the fence assembly in communication with the graduation sensor and configured to receive the sensor signal and to provide a distance signal including information associated with the distance;
   a display in communication with the monitoring circuit to receive the distance signal and display the information associated with the distance; and
   a thumb wheel, rotably fixed to the fence assembly, configured to roll along the shaft to move the fence assembly with respect to the shaft.

2. The apparatus of claim 1, wherein the monitoring circuit is programmed to translate the distance between at least two of a plurality of measurement systems and wherein at least one input is coupled to the fence assembly in communication with the monitoring circuit and is actuable to select one of the plurality of measurement systems.

3. The apparatus of claim 1, wherein the graduations comprise a stator.

4. The apparatus of claim 1, wherein the shaft is split along the longitudinal axis into a first shaft portion and a second shaft portion, with the first shaft portion slidable with respect to the second shaft portion.

5. The apparatus of claim 4, wherein the marking blade is a first marking blade affixed to the first shaft portion, the apparatus comprising:
   a second marking blade affixed to the second shaft portion, and
   additional graduations disposed on second shaft portion in alignment with the longitudinal axis of the shaft,
   wherein the graduation sensor is configured to monitor the additional graduations to provide a second sensor signal associated with a second distance between the fence assembly and the second marking blade,
   the monitoring circuit is configured to provide a second distance signal including information associated with the second distance; and
   the display is configured to receive the second distance signal and display the information associated with the second distance.

6. The apparatus of claim 5, wherein the monitoring circuit is configured to determine a difference between the distance and the second distance, and the display is configured to display the difference.

7. The apparatus of claim 1, wherein the shaft is a first shaft and further comprising a second shaft, wherein the fence assembly is coupled to the second shaft and movable along a second longitudinal axis the second shaft, which is parallel to the longitudinal axis of the first shaft.

8. The apparatus of claim 7, comprising:
   a second marking blade affixed to the second shaft, and
   additional graduations disposed on second shaft in alignment with the longitudinal axis of the shaft,
   wherein the graduation sensor is configured to monitor the additional graduations to provide a second sensor signal associated with a second distance between the fence assembly and the second marking blade,
   the monitoring circuit is configured to provide a second distance signal including information associated with the second distance; and
   the display is configured to receive the second distance signal and display the information associated with the second distance.

9. The apparatus of claim 8, wherein the monitoring circuit is configured to determine a difference between the distance and the second distance, and the display is configured to display the difference.

10. The apparatus of claim 1, comprising a collar slidably disposed on the shaft, with the fence assembly disposed between the marking blade and the collar, the collar including a lock configured to lock a position of the collar with respect to the shaft.

11. The apparatus of claim 10, wherein the collar includes regular features, and an adjustment ring is positively engaged with the regular features, the adjustment ring disposed between a non-threaded portion of the collar and the fence assembly, such that the adjustment ring is configured to rotate around the collar to displace the fence assembly along the shaft with respect to the collar, wherein the regular features are threads.

12. Method to mark a distance from an edge of a workpiece, comprising:
   sliding a fence assembly along a shaft to position a marking blade affixed to the shaft a distance from the fence assembly;
   sensing graduations on the shaft with a graduation sensor coupled to the fence assembly;
   communicating a sensor signal associated with the sensed graduations from the graduation sensor to a monitoring circuit coupled to the fence assembly;
   receiving the sensor signal with the monitoring circuit;
   associating the sensor signal with the distance by referencing the sensor signal with a memory of the monitoring circuit;
   providing, with the monitoring circuit, a distance signal associated with the sensor signal, the distance signal including information associated with the distance;
   receiving the distance signal including the information with a display; and
   displaying the distance with the display; and
   sliding a collar onto the shaft, with the fence assembly disposed between the marking blade and the collar, locking a position of the collar with respect to the shaft, and adjusting the position of the fence assembly with respect to the shaft by turning a ring threaded onto the collar.

13. The method of claim 12, comprising the fence assembly along a second shaft to position a second marking blade affixed to the second shaft a second distance from the fence assembly;
   sensing additional graduations on the second shaft with a graduation sensor coupled to the fence assembly;
   communicating a second sensor signal associated with the additional graduations from the graduation sensor to the monitoring circuit coupled to the fence assembly;

receiving the second sensor signal with the monitoring circuit;

associating the second sensor signal with the second distance by referencing the second sensor signal with a memory of the monitoring circuit;

providing, with the monitoring circuit, a second distance signal associated with the sensor signal, the second distance signal including additional information associated with the second distance;

receiving the second distance signal including the additional information with the display; and displaying the second distance with the display.

14. The method of claim 13, comprising determining a difference between the marking blade and the second marking blade, halving the distance and displaying a centerline distance.

15. The method of claim 13, comprising switching the monitoring circuit to an offset mode, and storing an offset.

16. A system to mark a distance from an edge of a work-piece, comprising:

a shaft extending along a longitudinal axis and including a graduations disposed in alignment with the longitudinal axis, wherein the graduations comprise a stator formed as a portion of a printed circuit affixed to the shaft;

a marking blade affixed to an end portion of the shaft substantially transverse to the longitudinal axis of the shaft, wherein the marking blade is at least partially circular, nonrotably fixed to the shaft, is substantially planar and disk shaped, wherein a centerline of the marking blade, perpendicular to a marking edge of the marking blade, is substantially parallel to the longitudinal axis of the shaft, wherein the marking blade is fastened to the shaft with a fastener;

a fence assembly coupled to the shaft movable along the longitudinal axis of the shaft, the fence assembly including a face configured to abut the edge of the work-piece, wherein the fence assembly comprises an edge circumscribing the face, the edge is at least partially circular and including a straight portion;

a lock screw disposed in the fence assembly to lock the fence assembly in position with respect to the shaft, wherein the lock screw is configured to engage a channel disposed in the shaft;

a graduation sensor coupled to the fence assembly and configured to monitor the graduations and provide a sensor signal associated with a distance between the fence assembly and the marking blade, wherein the graduation sensor includes a hall effect sensor to monitor the stator;

a monitoring circuit coupled to the fence assembly in communication with the graduation sensor and configured to receive the sensor signal and to provide a distance signal including information associated with the distance wherein the monitoring circuit is in communication with a calibration circuit to receive a calibration input to calibrate the distance signal in association with the calibration input;

a battery coupled to the monitoring circuit to power the monitoring circuit, wherein the monitoring circuit is configured to power the graduation sensor;

at least one hand-actuable switch configured to control electrical communication between the battery and the monitoring circuit;

at least a second switch in communication with the monitoring circuit and configured to program the monitoring circuit; and a digital display affixed to the fence assembly in communication with the monitoring circuit to receive the distance signal and display the information associated with the distance.

17. The system of claim 16, comprising a collar slidably disposed on the shaft, with the fence assembly disposed between the marking blade and the collar, the collar including a lock screw configured to lock a position of the collar with respect to the shaft.

18. The system of claim 17, wherein the collar includes a threaded portion, and an adjustment ring is coupled to the threaded portion, the adjustment ring disposed between a non-threaded portion of the collar and the fence assembly, such that the adjustment ring is configured to rotate around the collar to displace the fence assembly along the shaft with respect to the collar.

* * * * *